US011914312B2

(12) United States Patent
Shimizu et al.

(10) Patent No.: US 11,914,312 B2
(45) Date of Patent: Feb. 27, 2024

(54) DEVELOPING DEVICE AND IMAGE FORMING APPARATUS INCLUDING THE SAME

(71) Applicant: KYOCERA Document Solutions Inc., Osaka (JP)

(72) Inventors: Tamotsu Shimizu, Osaka (JP); Yuji Toyota, Osaka (JP); Yasuhiro Tauchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/858,537

(22) Filed: Jul. 6, 2022

(65) Prior Publication Data

US 2023/0030358 A1 Feb. 2, 2023

(30) Foreign Application Priority Data

Jul. 14, 2021 (JP) ................................ 2021-116253

(51) Int. Cl.

*G03G 15/09* (2006.01)
*G03G 15/08* (2006.01)
*G03G 9/113* (2006.01)

(52) U.S. Cl.

CPC ....... *G03G 15/0928* (2013.01); *G03G 9/1136* (2013.01); *G03G 9/1139* (2013.01); *G03G 15/0812* (2013.01); *G03G 2215/0609* (2013.01)

(58) Field of Classification Search

CPC ........... G03G 15/0928; G03G 15/0812; G03G 2215/0609

See application file for complete search history.

(56) References Cited

U.S. PATENT DOCUMENTS

2018/0203376 A1* 7/2018 Shimizu ............ G03G 15/0928

FOREIGN PATENT DOCUMENTS

JP H 08-240972 A 9/1996
JP 2004-205999 A 7/2004

* cited by examiner

*Primary Examiner* — Walter L Lindsay, Jr.
*Assistant Examiner* — Milton Gonzalez
(74) *Attorney, Agent, or Firm* — Stein IP, LLC

(57) ABSTRACT

A developing device includes a developing container storing a two-component developer containing a magnetic carrier and a toner, a developer carrying member carrying the developer on its outer circumferential surface, and a regulation member arranged to be opposed at a prescribed distance to the developer carrying member. The developer carrying member includes a developing sleeve on which a magnetic brush is formed, and a magnet secured in the developing sleeve and having a plurality of magnetic poles including a regulation pole opposed to the regulation member and a downstream-side magnetic pole arranged downstream of the regulation pole with respect to the rotation direction of the developing sleeve. The magnet is such that the vertical magnetic force gradient [mT/°] has a local minimum value near a position at which the vertical magnetic force is 0 [mT] between the downstream-side surface of the regulation member and the downstream-side magnetic pole.

8 Claims, 3 Drawing Sheets

DEVELOPING DEVICE AND IMAGE FORMING APPARATUS INCLUDING THE SAME

INCORPORATION BY REFERENCE

This application is based upon and claims the benefit of priority from the corresponding Japanese Patent Application No. 2021-116253 (filed on Jul. 14, 2021), the entire contents of which are incorporated herein by reference.

BACKGROUND

The present disclosure relates to a developing device that is mounted in an image forming apparatus including an image carrying member, such as a copy machine, a printer, a facsimile, or a multi-functional peripheral having functions thereof. The present disclosure relates particularly to a developing device that employs a two-component development method using a two-component developer including a toner and a carrier and an image forming apparatus including the same.

In an image forming apparatus, an electrostatic latent image formed on an image carrying member such as a photosensitive drum is developed by a developing device into a visible toner image. One type of such a developing device employs the two-component development method using a two-component developer including a magnetic carrier and a toner.

With the two-component development method, how to suppress toner scattering from the developing device is an important problem to be solved. Today, with growing demand for color printing and faster processing on image forming apparatuses, the worsening of toner scattering has been becoming notable. Toner scattering from the developing device may lead to contamination inside the image forming apparatus and may have adverse effects on other devices in the image forming apparatus as well as on output images.

One of the places where toner scattering as described above occurs is a region extending from where a developing roller (developer carrying member) and a regulation blade face each other (i.e., a regulation portion) to where the developing roller and a photosensitive member face each other (i.e., a developing region). Toner scattered in this region attaches to a cover of the developing roller, and as the amount of toner attached increases, it is collected by a magnetic brush on the developing roller, is conveyed as it is to the developing region, where it can cause toner stains on an image. Scattered toner also leaks through a gap in the developing device and causes contamination inside the body of the image forming apparatus.

SUMMARY

According to one aspect of the present disclosure, a developing device includes a developing container, a developer carrying member, and a regulation member, and develops an electrostatic latent image formed on the surface of an image carrying member into a toner image. The developing container stores a two-component developer containing a magnetic carrier and a toner. The developer carrying member is rotatably supported on the developing container, and carries the developer on its outer circumferential surface. The regulation member is arranged to be opposed at a prescribed distance to the developer carrying member. The developer carrying member includes a developing sleeve that is rotatable, carries the developer, and has a surface on which a magnetic brush is formed, and a magnet that is unrotatably secured in the developing sleeve and has a plurality of magnetic poles arranged at a prescribed distance from each other in the circumferential direction, which include a regulation pole that is arranged at a position opposed to the regulation member and a downstream-side magnetic pole that is arranged on the downstream side of the regulation pole with respect to the rotation direction of the developing sleeve. The magnet is such that the vertical magnetic force gradient [mT/] has a local minimum value near a position at which the vertical magnetic force is 0 [mT] between the downstream-side surface of the regulation member and the downstream-side magnetic pole with respect to the rotation direction of the developing sleeve.

DETAILED DESCRIPTION

Figure 1:
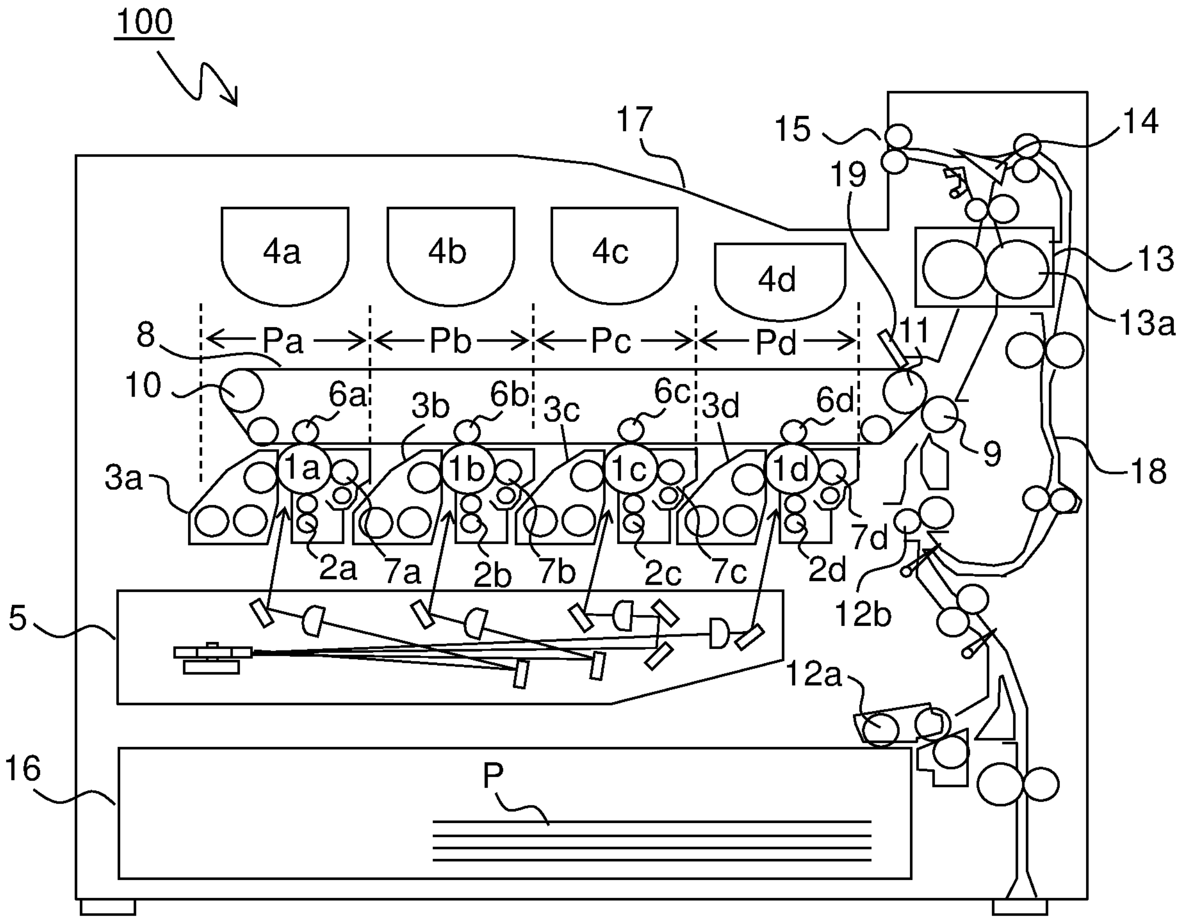
FIG. 1 is a side sectional view showing an internal configuration of an image forming apparatus including a developing device of the present disclosure.

With reference to the appended drawings, the following describes an embodiment of the present disclosure. FIG. 1 is a sectional view showing an internal structure of an image forming apparatus 100 including developing devices 3*a* to 3*d* of the present disclosure. In a main body of the image forming apparatus 100 (herein, a color printer), four image forming portions Pa, Pb, Pc, and Pd are disposed in order from an upstream side in a conveyance direction (a left side in FIG. 1). The image forming portions Pa to Pd are provided correspondingly to images of four different colors (yellow, cyan, magenta, and black), respectively, and sequentially form images of yellow, cyan, magenta, and black, respectively, by individually performing steps of charging, exposure, development, and transfer.

In the image forming portions Pa to Pd, photosensitive drums (image carrying members) 1*a*, 1*b*, 1*c*, and 1*d* are disposed, respectively, to carry visible images (toner images) of the respective colors. Moreover, an intermediate transfer belt (an intermediate transfer member) 8 that is driven by a belt drive motor (not shown) to rotate in a counterclockwise direction in FIG. 1 is provided adjacently to the image forming portions Pa to Pd. Toner images formed respectively on the photosensitive drums 1*a* to 1*d* are sequentially and primarily transferred in a superimposed manner on the intermediate transfer belt 8 moving while abutting on the photosensitive drums 1*a* to 1*d*. After that, the toner images thus primarily transferred on the intermediate transfer belt 8 are secondarily transferred by a secondary transfer roller 9 on a transfer sheet P as an example of a recording medium. Moreover, the toner images secondarily transferred to the transfer sheet P are fixed thereon in a fixing portion 13, and then the transfer sheet P is discharged from the main body of the image forming apparatus 100. An image forming process with respect to the photosensitive drums 1*a* to 1*d* is executed while the photosensitive drums 1*a* to 1*d* are rotated in a clockwise direction in FIG. 1.

The transfer sheet P on which toner images are to be secondarily transferred is housed in a sheet cassette 16 arranged in a lower part of the main body of the image forming apparatus 100. The transfer sheet P is conveyed to a nip between the secondary transfer roller 9 and a driving roller 11 of the intermediate transfer belt 8 via a paper feed roller 12*a* and a registration roller pair 12*b*. As the intermediate transfer belt 8, a seam-free (seamless) belt formed of a dielectric resin sheet is mainly used. Furthermore, a blade-shaped belt cleaner 19 for removing a residual toner or the like remaining on a surface of the intermediate transfer belt 8 is arranged on a downstream side of the secondary transfer roller 9.

Next, a description is given of the image forming portions Pa to Pd. Charging devices 2*a*, 2*b*, 2*c*, and 2*d* that charge the photosensitive drums 1*a* to 1*d*, respectively, an exposure device 5 that performs exposure based on image information with respect to the photosensitive drums 1*a* to 1*d*, developing devices 3*a*, 3*b*, 3*c*, and 3*d* that form toner images on the photosensitive drums 1*a* to 1*d*, respectively, and cleaning devices 7*a*, 7*b*, 7*c*, and 7*d* that remove a residual developer (toner) or the like remaining on the photosensitive drums 1*a* to 1*d*, respectively, are provided around and below the photosensitive drums 1*a* to 1*d* rotatably disposed.

Upon image data being inputted from a host apparatus such as a personal computer, first, surfaces of the photosensitive drums 1*a* to 1*d* are uniformly charged by the charging devices 2*a* to 2*d*, respectively. Then, by the exposure device 5, light is applied thereto so as to correspond to image data so that electrostatic latent images corresponding to the image data are formed on the photosensitive drums 1*a* to 1*d*, respectively. The developing devices 3*a* to 3*d* are filled with prescribed amounts of two-component developers including toners of yellow, cyan, magenta, and black, respectively. In a case where a percentage of the toners in the two-component developers filled in the developing devices 3*a* to 3*d* falls below a preset value due to after-mentioned toner image formation, the developing devices 3*a* to 3*d* are replenished with fresh supplies of toners from toner containers 4*a* to 4*d*, respectively. The toners in the developers are supplied onto the photosensitive drums 1*a* to 1*d* by the developing devices 3*a* to 3*d*, respectively, and electrostatically adheres thereto. Thus, there are formed toner images corresponding to the electrostatic latent images formed by exposure from the exposure device 5.

Further, by primary transfer rollers 6*a* to 6*d*, an electric field is applied at a prescribed transfer voltage between themselves and the photosensitive drums 1*a* to 1*d*, respectively. Thus, the toner images of yellow, magenta, cyan, and black on the photosensitive drums 1*a* to 1*d* are primarily transferred on the intermediate transfer belt 8. These images are formed in a prescribed positional relationship. After that, a residual toner or the like remaining on the surfaces of the photosensitive drums 1*a* to 1*d* after primary transfer is removed by the cleaning devices 7*a* to 7*d*, respectively, in preparation for subsequent formation of new electrostatic latent images.

The intermediate transfer belt 8 is stretched over a driven roller 10 on an upstream side and the driving roller 11 on a downstream side. As the driving roller 11 is driven to rotate by the belt drive motor (not shown), the intermediate transfer belt 8 starts to rotate in the counterclockwise direction, and then the transfer sheet P is conveyed at prescribed timing from the registration roller pair 12*b* to the nip (a secondary transfer nip) between the driving roller 11 and the secondary transfer roller 9 provided adjacently thereto, where the toner images on the intermediate transfer belt 8 are secondarily transferred on the transfer sheet P. The transfer sheet P on which the toner images have been secondarily transferred is conveyed to the fixing portion 13.

The transfer sheet P conveyed to the fixing portion 13 is heated and pressed by a fixing roller pair 13*a*, and thus the toner images are fixed on a surface of the transfer sheet P to form a prescribed full-color image thereon. A conveyance direction of the transfer sheet P on which the full-color image has been formed is controlled by a branch portion 14 branching off in a plurality of directions, and the transfer sheet P is directly (or after being conveyed to a double-sided conveyance path 18 and subjected to double-sided image formation therein) discharged to a discharge tray 17 by a discharge roller pair 15.

Figure 2:
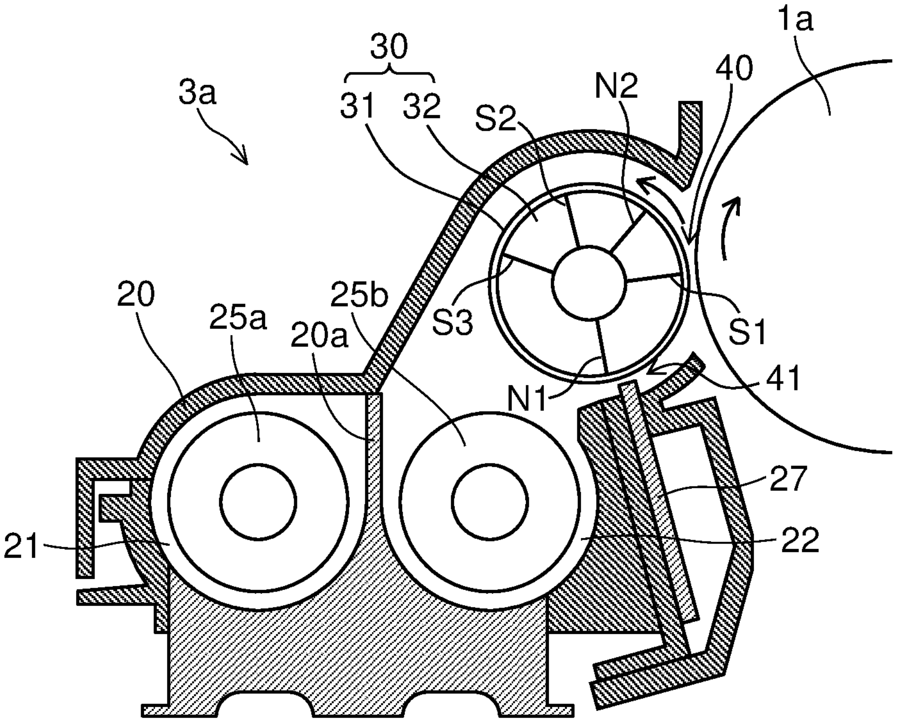
FIG. 2 is a side sectional view of a developing device according to one embodiment of the present disclosure.

FIG. 2 is a side sectional view of the developing device 3*a* mounted in the image forming apparatus 100. While the following exemplarily describes the developing device 3*a* arranged in the image forming portion Pa shown in FIG. 1, the developing devices 3*b* to 3*d* arranged in the image forming portions Pb to Pd, respectively, basically have a similar configuration to that of the developing device 3*a*, and thus descriptions thereof are omitted.

As shown in FIG. 2, the developing device 3*a* includes the developing container 20 for containing a two-component developer (hereinafter, simply referred to also as a developer) including a magnetic carrier and a toner. The developing container 20 is divided by a partition wall 20*a* into a stirring conveyance chamber 21 and a supply conveyance chamber 22. In the stirring conveyance chamber 21 and the supply conveyance chamber 22, a stirring conveyance screw 25*a* and a supply conveyance screw 25*b* for making a mixture of a toner supplied from the toner container 4*a* (see FIG. 1) and a magnetic carrier, stirring the mixture, and charging the toner are rotatably disposed, respectively. This embodiment uses a two-component developer composed of a positively chargeable toner and a ferrite/resin-coated carrier. Detailed configurations of the toner and the carrier will be described later.

Further, the developer is conveyed while being stirred by the stirring conveyance screw 25*a* and the supply conveyance screw 25*b* in an axis direction thereof (a direction perpendicular to a plane on which FIG. 2 is drawn) and circulates between the stirring conveyance chamber 21 and the supply conveyance chamber 22 via communication portions (not shown) formed at the both ends of the partition wall 20*a*. That is, in the developing container 20, a circulation route of the developer is formed by the stirring conveyance chamber 21, the supply conveyance chamber 22, and the communication portions.

The developing container 20 extends to a diagonally upper right side in FIG. 2, and a developing roller 30 (a developer carrying member) is arranged on a diagonally upper right side of the supply conveyance screw 25*b* in the developing container 20. Further, a part of an outer circumferential surface of the developing roller 30 is exposed through an opening 20*e* of the developing container 20 and is opposed at a prescribed distance (a development gap) to the photosensitive drum 1*a*, thus forming a development region 40. The developing roller 30 rotates (performs trail rotation at a position opposed to the photosensitive drum 1*a*) in a counterclockwise direction in FIG. 3.

The developing roller 30 is composed of a cylindrical developing sleeve 31 that rotates in the counterclockwise direction in FIG. 2 and a magnet 32 that has a plurality of magnetic poles and is unrotatably secured in the developing sleeve 31. While the developing sleeve 31 used in this embodiment is a developing sleeve having a knurled surface, it is also possible to use a developing sleeve having a surface with a multitude of concaves (dimples) formed therein, a developing sleeve having a blasted surface, a developing sleeve having a surface not only knurled and including concaves formed therein but also blasted, a developing sleeve having a plated surface intended to improve endurance, a developing sleeve having an anodized surface, or a developing sleeve having a surface treated, after being anodized, by a method in which a metallic salt such as Ni, Sn, or Mo is applied to a porous region of anodized aluminum, i.e., a so-called secondary electrolytic coloring method. Particularly when having an anodized surface or a surface treated, after being anodized, by the secondary electrolytic coloring method, a developing sleeve has not only improved endurance but also an effect of suppressing the occurrence of a development leak. This is because, with the surface of the developing sleeve anodized, a leakage current generated at a magnetic brush becomes unlikely to spread in a circumferential direction on a surface of the developing roller 30 and thus is prevented from developing into a larger-scale leakage current involving adjacent magnetic brushes.

The magnet 32 has a five-pole configuration composed of a main pole S1 (downstream-side magnetic pole), a regulation pole (pumping pole) N1, conveyance poles S2 and N2, and a peeling pole S3. Upon a drive force being inputted to the developing device 3*a*, while the developing sleeve 31 rotates, the magnet 32 does not rotate. By a developing voltage power supply (not shown), a developing voltage composed of a direct current voltage Vdc and an alternating current voltage Vac is applied to the developing roller 30.

Furthermore, a regulation blade 27 (a regulation member) is attached to the developing container 20 along a longitudinal direction of the developing roller 30 (a perpendicular direction to the plane on which FIG. 2 is drawn). A slight clearance (gap) is formed between a distal end of the regulation blade 27 and a surface of the developing roller 30, thus forming a regulation portion 41. In this embodiment, a magnetic blade made of stainless steel (SUS430) is used as the regulation blade 27.

A magnetic field in a direction of magnetic attraction between the regulation pole Ni of the magnet 32 and the regulation blade 27 is generated, so that a magnetic brush is formed by developer particles linked into chains between the regulation blade 27 and the developing roller 30, and when the magnetic brush passes through the regulation blade 27 (the regulation portion 41), a layer thickness thereof is regulated to a desired height. After that, when the developing sleeve 31 rotates in the counterclockwise direction and the magnetic brush moves to the developing region 40, the main pole S1 applies a magnetic field such that the magnetic brush makes contact with the surface of the photosensitive drum 1*a* and develops an electrostatic latent image thereon.

Moreover, when the developing sleeve 31 rotates in the counterclockwise direction, then the conveyance poles N2 and S2 apply a magnetic field in a direction along the outer circumferential surface of the developing sleeve 31 to the magnetic brush, and thus together with the magnetic brush, a part of the developer left unused for toner image formation is collected on the developing sleeve 31. Moreover, at the peeling pole S3 being identical in polarity to the conveyance pole S2, the magnetic brush is separated from the developing roller 30 and falls into the supply conveyance chamber 22. Further, the magnetic brush that has thus fallen is stirred and conveyed by the supply conveyance screw 25*b*, and then a magnetic field of the regulation pole N1 again causes a magnetic brush to be formed on the developing sleeve 31.

Figure 3:
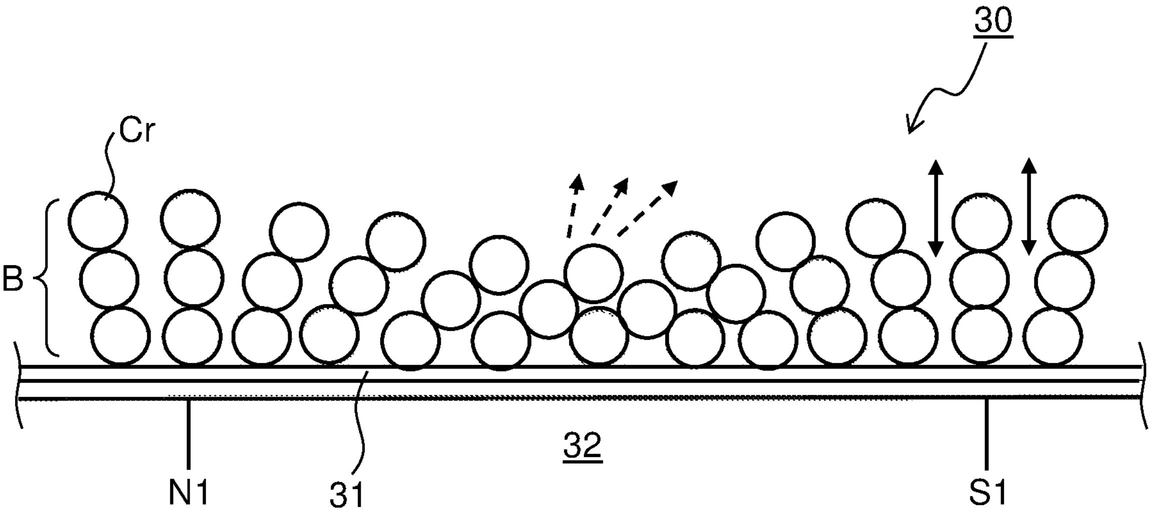
FIG. 3 is a diagram schematically illustrating the behavior of a magnetic brush between a regulation pole and a main pole of a developing roller.

Next, a description is given of a magnetic force distribution of the magnet 32 in the circumferential direction of the developing roller 30, which characterizes the present disclosure. FIG. 3 is a diagram schematically illustrating the behavior of the magnetic brush B between the regulation pole N1 and the main pole S1 of the developing roller 30. While the outer circumferential surface of the developing roller 30 has an arc-shaped sectional shape, in FIG. 3, it is shown to have a flat sectional shape for convenience' sake.

As mentioned above, toner scattering occurs notably in a region from where the developing roller 30 and the regulation blade 27 face each other (i.e., the regulation portion 41) to where the developing roller 30 and the photosensitive drums 1*a* to 1 *d* face each other (i.e., the developing region 40). Here, the magnetic brush B changes from a state standing on the regulation pole N1 as shown in FIG. 3 to, as the result of the developing sleeve 31 rotating (moving in the direction indicated by a hollow arrow), a state lying at a pole interval between the regulation pole N1 and the main pole S1. At this time, magnetic brushes B make contact with each other and cause toner scattering (indicated by broken-line arrows in FIG. 3).

Also at the place where the magnetic brush B changes from the lying state back to the standing state, toner scattering tends to occur. When as the developing sleeve 31 rotates the magnetic brush B moves to a downstream-side magnetic pole (here, the main pole S1), the vertical magnetic force of the main pole S1 causes the magnetic brush B to change to the standing state. If the downstream-side magnetic pole is not the main pole S1, no problem occurs. If the downstream-side magnetic pole is the main pole S1 and in addition if the magnetic brush B in the standing state has a large width (length in the circumferential direction), the movement of toner (indicated by solid-line arrows in FIG. 3) under the electric field increases accordingly, leading to improved developing properties. On the other hand, weakly or oppositely charged toner is sucked into the flow of the moving toner, resulting in increased toner scattering. It is thus necessary to take a measure to suppress toner scattering while maintaining developing properties.

Accordingly, in the developing devices 3*a* to 3*d* according to the embodiment, through adjustment of the magnetic force distribution of the magnet 32 in the circumferential direction of the developing roller 30, more specifically, through adjustment of the magnetic force gradient (hereinafter referred to as the vertical magnetic force gradient), in the circumferential direction, of the vertical magnetic force, which is the magnetic force of the developing roller 30 in the radial direction, toner scattering in the region from the regulation portion 41 to the developing region 40 is suppressed.

Figure 4:
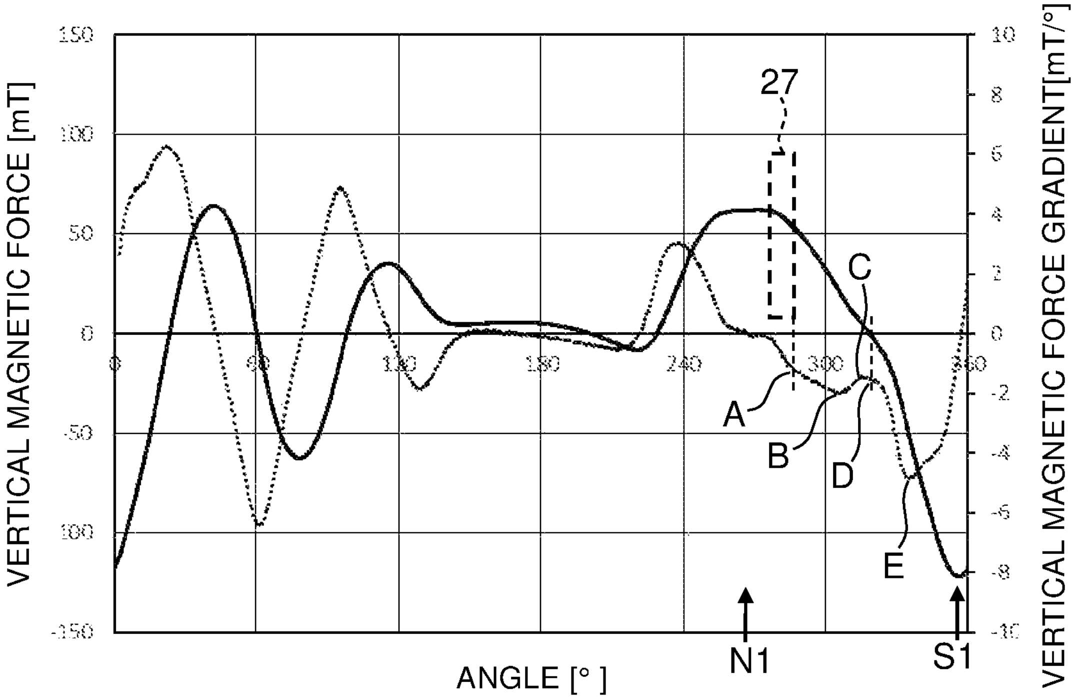
FIG. 4 is a graph showing vertical magnetic force distribution and variation in vertical magnetic force gradient in the circumferential direction of the developing roller.
Figure 5:
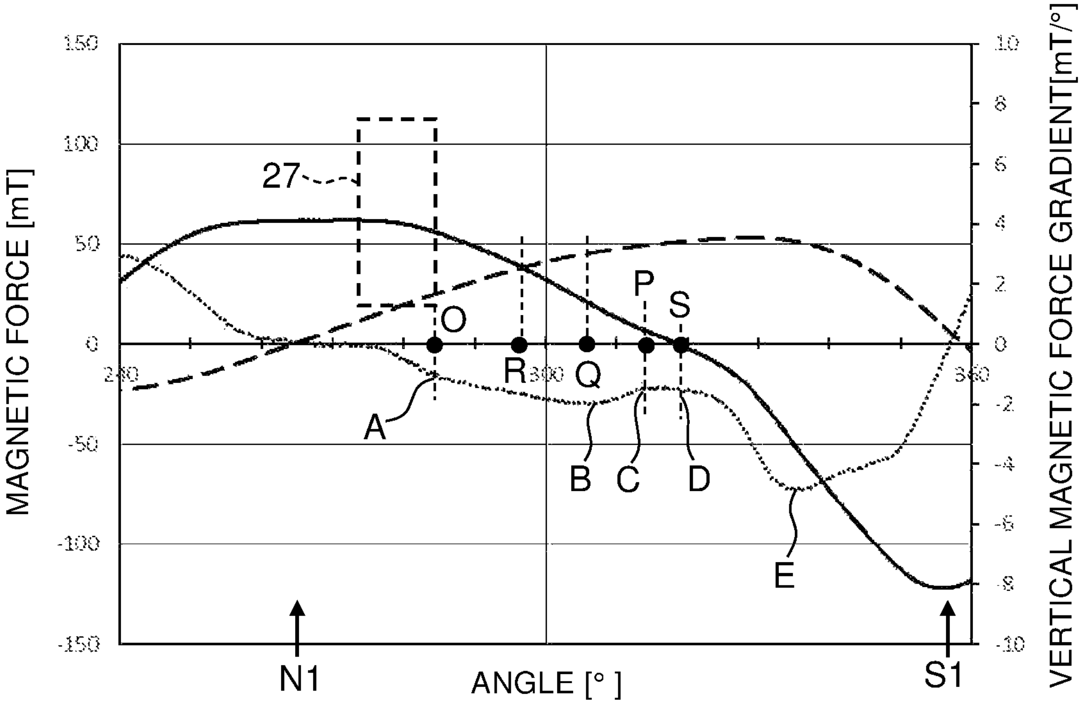
FIG. 5 is an enlarged view from the regulation blade to the main pole in FIG. 4.

FIG. 4 is a graph showing vertical magnetic force distribution and variation in vertical magnetic force gradient in the circumferential direction of the developing roller 30. FIG. 5 is an enlarged view from the regulation blade 27 to the main pole S1 in FIG. 4. With reference to FIGS. 4 and 5, the vertical magnetic force gradient of the magnet 32 in the developing devices 3*a* to 3*d* according to the embodiment will be described in detail. In FIGS. 4 and 5, the vertical magnetic force is represented by a solid line, the vertical magnetic force gradient is represented by a dotted line, and the horizontal magnetic force is represented by a broken line.

First, a description will be given of a method of suppressing toner scattering at a place where the magnetic brush changes from a state standing on the regulation pole N1 to a state lying at the pole interval between the regulation pole N1 and the main pole S1. In this case, it is effective to make gentle the vertical magnetic force gradient at the pole interval (point S in FIG. 5) at which the vertical magnetic force is 0 [mT].

A magnetic attraction force, that is, the force by which developer is attracted to the developing roller 30, increases as the absolute value of the vertical magnetic force [mT] increases; it increases also as the vertical magnetic force gradient [mT/°] increases. In general, the vertical magnetic force gradient has a local maximum at a pole interval; thus, with the magnetic brush in the lying state, it is attracted to the developing roller 30 with a strong force. As a result, when the magnetic brush changes from the standing state to the lying state, it falls under the strong force, and this makes toner scattering likely to occur.

Thus, by designing such that the vertical magnetic force gradient has a local minimum value around the position at which the vertical magnetic force is 0 [mT] in the circumferential direction of the developing roller 30, it is possible to eliminate the effect of a strong magnetic attraction force at a pole interval at which the magnetic brush changes from the standing state to the lying state, and thereby to suppress toner scattering from the magnetic brush.

Here, near the downstream-side surface (point O in FIG. 5) of the regulation blade 27 is a place where a force is required with which to convey developer by the rotation of the developing roller 30. In particular, in a case where magnetic regulation by the regulation blade 27 which is a magnetic member is used, unless the vertical magnetic force gradient A closely on the downstream side of the regulation blade 27 is large enough, the horizontal magnetic force that acts in the direction moving developer back toward the regulation blade 27 destabilizes the its conveyance.

Accordingly, it is necessary, by making the vertical magnetic force gradient closely on the downstream of the regulation blade 27 large to a certain degree and thereby securing a magnetic attraction force, to obtain a developer conveyance force generated by the magnetic attraction force. A design is then necessary that thereafter reduces the vertical magnetic force gradient near the position (point S in FIG. 5) at which the vertical magnetic force is 0 [mT]. Accordingly, it is preferable that the point (point P in FIG. 5) at which the vertical magnetic force gradient has a local minimum value C be at least on the downstream side of the regulation blade 27 with respect to the rotation direction of the developing roller 30.

Moreover, to restrain the magnetic brush from falling from the standing state under the strong force, it is preferable that the point (point P in FIG. 5) at which the vertical magnetic force gradient has a local minimum value C be arranged at where the magnetic brush starts to fall.

In summary, it is preferable that point P at which the vertical magnetic force gradient has a local minimum value C be on the downstream side of point R at which, as shown in FIG. 5, the vertical magnetic force and the horizontal magnetic force (the magnetic force in the circumferential direction) are equal (the magnetic brush is inclined at about 45°) but on the upstream side of point S at which the vertical magnetic force is 0 [mT] (the magnetic brush is inclined at about 0°). It is more preferable that point P be on the downstream side of point Q at which the ratio of the vertical magnetic force to the horizontal magnetic force equals 1:2 (the magnetic brush is inclined at about 26°).

Next, a description will be given of a method of suppressing toner scattering at a place where the magnetic brush changes from a state lying at the pole interval between the regulation pole N1 and the main pole S1 to a state standing on the main pole S1. When the magnetic brush rises, it does in such a direction that the intervals between magnetic brushes increase; thus the strength of the magnetic attraction force is not much related to toner scattering. Even so, the larger the intervals between magnetic brushes, the more freely toner can move. In particular, at the main pole S1, a magnetic brush in the standing state tends to cause toner movement under an electric field, and the movement of normally charged toner activates the movement of weakly or oppositely charged toner. As a result, while developing properties improve, toner scattering increases. It is thus preferable to raise the vertical magnetic force as sharply as possible to reduce the width over which the magnetic brush stays standing.

That is, between the regulation pole N1 and the pole interval, where the magnetic brush falls from the standing state, the vertical magnetic force gradient is set at a certain degree closely on the downstream side of the regulation blade 27 to secure an amount of developer conveyed and the vertical magnetic force gradient is set to be gentle near where the vertical magnetic force is 0 [mT] to suppress toner scattering resulting from collision between magnetic brushes. In contrast, between the pole interval and the main pole S1, where the magnetic brush stands from the lying state, the vertical magnetic force is raised sharply to reduce the region where toner scattering occurs.

Accordingly, it is preferable that the relationship among the local maximum value B of the vertical magnetic force gradient present between the downstream-side surface O of the regulation blade 27 and point P at which the local minimum value C is reached, the local maximum value E of the vertical magnetic force gradient present between point P at which the local minimum value C is reached and the peak position of the vertical magnetic force of the main pole S1 (downstream-side magnetic pole), and the vertical magnetic force gradient D with the vertical magnetic force 0 [mT] (point S) fulfill Expression (1) below.

$$|C| \leq |D| < |B| < |E| \quad (1)$$

With the vertical magnetic force gradient set as described above, it is possible, while effectively suppressing toner scattering in a region from the regulation blade 27 to the developing region 40, to secure an amount of developer conveyed and thereby maintain developing properties.

Next, a description is given of a method for measuring the vertical magnetic force gradient of the magnet 32 of the developing roller 30. In this embodiment, the developing roller 30 is attached to an angle adjusting jib, and while the developing roller 30 is rotated for a set angle at a time, the measurement was performed using a magnetic force measuring device (GAUSS METER Model GX-100 produced by Nihon Denji Sokki Co., Ltd.). While when measurement accuracy is extremely high, the vertical magnetic force gradient can be determined by dividing a difference between values of the vertical magnetic force measured at different angles by a difference in measurement angle, when the measurement accuracy is low, the vertical magnetic force gradient cannot be determined with accuracy. For this reason, in the present disclosure, the vertical magnetic force was measured at a measurement angle varied by 0.02°, and (a difference in magnetic force at a difference of 0.08°/0.08°) was defined to be a gradient 1 at a middle point within a range of 0.08°. Further, an average gradient per 2° of the gradient 1 was used as the vertical magnetic force gradient. Table 1 shows an example of the measurement of the vertical magnetic force gradient.

TABLE 1

| Angle | Vertical Magnetic Force | Gradient 1 | | Average Gradient | |
|---|---|---|---|---|---|
| [°] | [mT] | [mT/°] | Calculation Method | [mT/°] | Calculation Method |
| 10.00 | 24.7 | 5.25 | (Vertical Magnetic Force Difference Between Values at 9.96° and 10.04°)/0.08 | 6.13 | Average of Values of Gradient 1 at 9.00° to 11.00° |
| 10.02 | 24.5 | 6.25 | (Vertical Magnetic Force Difference Between Values at 9.98° and 10.06°)/0.08 | 6.15 | Average of Values of Gradient 1 at 9.02° to 11.02° |
| 10.04 | 24.4 | 6.25 | (Vertical Magnetic Force Difference Between Values at 10.00° and 10.08°)/0.08 | 6.15 | Average of Values of Gradient 1 at 9.04° to 11.04° |
| 10.06 | 24.3 | 5 | (Vertical Magnetic Force Difference Between Values at 10.02° and 10.10°)/0.08 | 6.15 | Average of Values of Gradient 1 at 8.06° to 11.06° |
| 10.08 | 24.2 | 5 | (Vertical Magnetic Force Difference Between Values at 10.04° and 10.12°)/0.08 | 6.18 | Average of Values of Gradient 1 at 9.08° to 11.08° |
| 10.10 | 24.1 | 5.25 | (Vertical Magnetic Force Difference Between Values at 10.06° and 10.14°)/0.08 | 6.18 | Average of Values of Gradient 1 at 9.10° to 11.10° |
| 10.12 | 24 | 6.25 | (Vertical Magnetic Force Difference Between Values at 10.08° and 10.16°)/0.08 | 6.18 | Average of Values of Gradient 1 at 9.12° to 11.12° |
| 10.14 | 23.8 | 6.25 | (Vertical Magnetic Force Difference Between Values at 10.10° and 10.18°)/0.08 | 6.20 | Average of Values of Gradient 1 at 9.14° to 11.14° |
| 10.16 | 23.7 | 6.25 | (Vertical Magnetic Force Difference Between Values at 10.12° and 10.20°)/0.08 | 6.20 | Average of Values of Gradient 1 at 9.16° to 11.16° |

In Table 1, for example, the gradient 1 (6.25 [mT/° ]) at an angle of 10.00° has a value obtained by dividing by 0.08° a difference G1−G2 between a vertical magnetic force G1 at 9.96° and a vertical magnetic force G2 at 10.04°. Furthermore, the average gradient (6.25 [mT/° ]) at 10.00° is an average value of values of the gradient 1 (2°/0.02°=100 values) per 2° between 9.00° and 11.00°.

Next, a description is given of a carrier used in the developing devices 3*a* to 3*d* of this embodiment. The carrier used herein includes a carrier core that is a particle of a magnetic substance and the coat layer that is made of a silicone resin or the like and is formed on a surface of the carrier core. A silicone-based resin can be applied to form a thin coat film, thus enhancing uniformity of the coat layer. Furthermore, the smaller a thickness of the coat layer, the higher a capacitance of the coat layer, and thus an effect of the ferroelectric substance added to the coat layer becomes likely to be exerted.

The carrier can be of a varying shape from indefinite to spherical. Moreover, as the carrier, a carrier having an average particle diameter (number-average particle diameter) of not less than 20 μm and not more than 65 μm can be used. When having an average particle diameter of not more than 65 μm, the carrier is increased in specific surface area and thus can carry an increased amount of the toner. Thus, a toner concentration in a magnetic brush can be maintained high, and the toner is therefore sufficiently supplied to the developing roller 30, so that a toner layer having a sufficient thickness can be formed. As a result, it is possible to cause a sufficient amount of the toner to fly from the toner layer to an electrostatic latent image on a photosensitive member, to suppress a decrease in image density, and to suppress unevenness in the image density. Furthermore, since the toner is sufficiently supplied to the developing roller 30, it becomes unlikely that a toner dropout region is formed in the toner layer of the developing roller 30, thus suppressing the occurrence of a hysteresis.

When the carrier has an average particle diameter smaller than 20 μm, there occurs carrier development in which the carrier adheres to the photosensitive drums 1*a* to 1*d*. The carrier that has adhered thereto might shift to the intermediate transfer belt 8 to cause a transfer void or move to the belt cleaner 19 to cause a cleaning failure. Furthermore, when the carrier has an average particle diameter larger than 65 μm, with the toner in the two-component developer moving from the developing roller 30 to any of the photosensitive drums 1*a* to 1*d*, a coarse magnetic brush of the two-component developer is formed to degrade image quality.

Examples of a material of the carrier core include magnetic metals such as iron, nickel, and cobalt, alloys thereof, alloys containing rare earths, soft ferrites such as hematite, magnetite, manganese-zinc-based ferrite, nickel-zinc-based ferrite, manganese-magnesium-based ferrite, and lithium-based ferrite, iron-based oxides such as copper-zinc-based ferrite, and mixtures thereof. The carrier core is produced by a known method such as sintering or atomization. Among carriers made of the above-described materials, ferrite carriers have excellent fluidity and are also chemically stable and thus are favorably used from viewpoints of enhancing image quality and prolonging service life.

As the ferroelectric substance, barium titanate particles are added to the coat layer. While hydrothermal polymerization, an oxalate method, or the like is used to produce barium titanate, barium titanate has physical properties varying depending on a production method thereof. When produced by the hydrothermal polymerization in particular, barium titanate has hollows therein and thus has a small absolute specific gravity and a sharp particle diameter distribution. As a result, compared with a case of being produced by any other production method, barium titanate produced by the hydrothermal polymerization has excellent dispersibility in a coat resin and thus can be dispersed uniformly. Accordingly, the charging performance of the carrier is also made uniform, and thus the hydrothermal polymerization is suitably used in the present disclosure.

Preferably, barium titanate has a volume average particle diameter of not less than 100 nm and not more than 500 nm. When having a particle diameter smaller than 100 nm, barium titanate is abruptly decreased in relative dielectric constant, so that an effect thereof related to the relative dielectric constant is reduced. On the other hand, when having a particle diameter of not less than 500 nm, barium titanate can hardly be uniformly dispersed in the coat layer.

When barium titanate is added in an amount of not less than 5 parts by mass with respect to a coat weight, an effect of stabilizing a charge amount starts to manifest itself, and when barium titanate is added in an amount of not less than 25 parts by mass with respect thereto, the effect of stabilizing a charge amount is more remarkably exhibited. When added in an excessively large amount, however, barium titanate can no longer be completely contained in the coat layer and might be partly liberated from the coat layer. A liberated part of the barium titanate might move to the photosensitive drums 1*a* to 1*d* and further into an edge part of a cleaning blade of each of the cleaning devices 7*a* to 7*d*, resulting in causing a cleaning failure. Particularly in a method in which toners in the toner containers 4*a* to 4*d* are each mixed with a carrier and then are replenished to the developing devices 3*a* to 3*d*, respectively, a part of barium titanate liberated through use thereof is supplied to the developing devices 3*a* to 3*d* to increase a load on the cleaning blade. For this reason, barium titanate is added in an amount of preferably not less than 5 parts by mass and not more than 45 parts by mass and more preferably not less than 25 parts by mass and not more than 45 parts by mass.

As an electric conductor, carbon black is added to the coat layer. When the carbon black is added in an excessively large amount, a part of the carbon black liberated from the coat layer might adhere to the toner, causing color turbidity of toners of colors other than black. On the other hand, when the carbon black is added in an excessively small amount, it is unlikely that electric charge moves from the carrier to the toner, resulting in a failure to cause a smooth increase in toner charge amount. In the carrier of the present disclosure, barium titanate (the ferroelectric substance) is added to the coat layer so that a carrier resistance is decreased, and thus an amount of carbon black to be added can be reduced by an amount corresponding to a decrease in the carrier resistance.

Adding the ferroelectric substance (barium titanate) to the coat layer enhances an electric charge retaining capability of the carrier, thus enabling sufficient electric charge to be applied to the toner. Furthermore, adding the electric conductor (carbon black) to the coat layer enables smooth movement of electric charge from the carrier to the toner. Even when a toner concentration is increased to increase the number of toner particles to be charged, synergy between the above-described two additives enables electric charge to be applied to a saturation level of a charge amount of the toner particles.

Furthermore, barium titanate having a high hardness is added as the ferroelectric substance to the coat layer of the carrier, so that abrasion of the coat layer is reduced, thus making it possible to achieve a longer service life of the carrier. Furthermore, with barium titanate added, a carrier resistance is decreased compared with a case where only carbon black is added, and thus an amount of carbon black to be added can be reduced. As a result, it is possible to suppress color turbidity resulting from adhesion of carbon black to the toner. Moreover, the carrier is improved in electric charge imparting performance, and thus even when a toner concentration in the developer is increased, a change in toner charge amount is reduced. As a result, the toner charge amount is stabilized, and it is possible to stably suppress toner scattering.

Other than the above, the present disclosure is not limited to the foregoing embodiment and can be variously modified without departing from the spirit of the present disclosure. For example, while in the foregoing embodiment the magnet 32 of the developing roller 30 has a configuration in which the main pole S1 is arranged as the downstream-side pole relative to the regulation pole N1, it is also possible to use a magnet in which a pole (conveyance pole) is arranged between a regulation pole and a main pole. In that case, the pole arranged between the regulation pole and the main pole is the downstream-side pole, and the regulation pole and the downstream-side pole, and also the downstream-side pole and the main pole, have different polarities (the regulation pole and the main pole have the same polarity).

Furthermore, while the foregoing embodiment exemplarily describes the color printer shown in FIG. 1 as the image forming apparatus 100, the present disclosure is not limited to a color printer and is applicable also to various types of image forming apparatuses including a developing device that employs the two-component development method, such as monochrome and color copy machines, a monochrome printer, and a digital multi-functional peripheral. The following more specifically describes the effects of the present disclosure with reference to examples.

Example 1

[Production of Carrier Containing Ferroelectric Particles]

By use of a homomixer, 200 parts by mass of a silicone resin (KR-255 produced by Shin-Etsu Chemical Co., Ltd. and having a nonvolatile content of 50%), 20 parts by mass of barium titanate (produced by Sakai Chemical Industry Co., Ltd. and having a volume average particle diameter of 304 nm), 7 parts by mass of carbon black (Ketjenblack EC produced by Lion Corporation), and 800 parts by mass of toluene were dispersed to provide a coat solution. The coat solution thus obtained was sprayed using a fluidized-bed coating device over 5 kg of a carrier core (an Mn ferrite carrier having a volume average particle diameter of 34.7 μm, a saturation magnetization of 80 emu/g, and a coercive force of 8 Oe and produced by Dowa IP Creation Co., Ltd.) under heating at 70° C. to 80° C. so that the carrier core was coated with the coat solution. After that, the carrier core was calcined for an hour at 200° C. to 250° C. using an electric furnace, was cooled down, and then was crushed and classified using a sieve to provide a carrier that included a coat layer containing ferroelectric particles.

Example 2

[Evaluation of Amount of Toner Scattered with Vertical Magnetic Force Gradient Varied]

An evaluation was performed of the amount of toner scattered with the vertical magnetic force gradient of the developing roller 30 varied. In the test method, a test apparatus as shown in FIG. 1 is mounted with developing devices 3*a* to 3*d* as shown in FIG. 2 (Disclosed Examples 1 to 3 and Comparative Examples 1 to 4) in which the following parameters were varied: in the range from the regulation blade 27 to the developing region 40, the vertical magnetic force gradient A at the downstream-side surface (O in FIG. 5) of the regulation blade 27, the local maximum value B and the local minimum value C of the vertical magnetic force gradient between the regulation blade 27 and the pole interval, the vertical magnetic force gradient D at the point (S in FIG. 5) at which the vertical magnetic force is 0 [mT], the local maximum value E of the vertical magnetic force gradient between the pole interval and the developing region 40, and the positions (angles), from the downstream-side surface of the regulation blade 27, of the points at which the horizontal magnetic force divided by the vertical magnetic force is 1 and 0.5 (R and Q in FIG. 5), the point at which the vertical magnetic force gradient has the local minimum value C (P in FIG. 5), and the point at which the vertical magnetic force is 0 [mT].

On the test apparatus, a test image of a print percentage of 1% was printed on 5000 sheets continuously, thereafter a test image of a print percentage of 20% was printed on 5000 sheets continuously, and then toner scattering from the regulation blade 27 to the developing region 40 was inspected visually.

Image formation conditions were as follows. A printing velocity (process velocity) was set to 55 sheets per minute, used as the developing roller 30 was a developing sleeve 31 having an outer circumferential surface in which 80 rows of concaves were formed (knurled) and an outer diameter of 20 mm, used as the regulation blade 27 was a magnetic blade made of stainless steel (SUS430) and having a thickness of 1.5 mm, and a distance (a regulation gap) between the regulation blade 27 and the developing roller 30 was set to 0.5±0.03 mm. A development voltage obtained by superimposing an alternating-current voltage having a peak-to-peak value (Vpp) of 1125 V, a frequency of 10 kHz, and a duty of 50% on a direct-current voltage of 250 V was applied to the developing roller 30.

The photosensitive drums 1*a* to 1*d* were formed of an amorphous silicon (a-Si) photosensitive member having a relative dielectric constant of 11, the developing roller 30 was set to rotate (perform trail rotation at an opposed position) at a circumferential velocity ratio of 1.8 with respect to the photosensitive drums 1*a* to 1*d*, and a distance (a DS distance) between the photosensitive drums 1*a* to 1*d* and the developing roller 30 was set to 0.375±0.025 mm. Furthermore, an elastic belt was used as the intermediate transfer belt 8.

A positively chargeable toner having an average particle diameter of 6.8 μm was used as a toner, and a resin-coated carrier produced in Example 1 was used as a carrier. An initial toner concentration in the developer (a weight ratio of the toner to the carrier) was set to 6%.

An evaluation method was adopted in which a case where slight toner scattering was observed was indicated as "G (good)," a case where light toner scattering was observed as "F (fair)," and a case where severe toner scattering was observed as "P (poor)."

R at which the vertical magnetic force and the horizontal magnetic force were equal but on the upstream side of point S at which the vertical magnetic force was 0 [mT], suppressed occurrence of toner scattering.

In particular, in Disclosed Examples 1 and 2, where the relationship among the local maximum value B of the vertical magnetic force gradient present between the vertical magnetic force gradient A closely on the downstream side of the regulation blade 27 and the local minimum value C, the local maximum value E of the vertical magnetic force gradient present between the local minimum value C and the peak position of the vertical magnetic force of the main pole S1, and the vertical magnetic force gradient D with the vertical magnetic force 0 [mT] (point S) fulfilled $|C| \leq |D| < |B| < |E|$, toner scattering was slight.

By contrast, with the developing devices 3*a* to 3*d* of Comparative Examples 1 to 4, where the vertical magnetic force gradient had no local maximum value B or local minimum value C between closely on the downstream side of the regulation blade 27 and point S at which the vertical magnetic force was 0 [mT], toner scattering was severe.

The results above confirm that adopting a vertical magnetic force distribution such that the vertical magnetic force gradient has a local minimum value C between the downstream-side surface of the regulation blade 27 and the point (point S) at which the vertical magnetic force is 0 [mT] helps effectively suppress toner scattering in the region from the regulation blade 27 to the developing region 40.

While the results described were obtained by using the resin-coated carrier containing barium titanate added thereto as ferroelectric particles, which was produced in Disclosed Example 1, it has been confirmed that similar effects can be obtained also by using other types of carriers.

The present disclosure is usable in a developing device that uses a two-component developer including a toner and a carrier. Through the use of the present disclosure, it is possible to provide a developing device capable of improving toner charge rising characteristics in the two-component development method and suppressing the occurrence itself of scattering of a toner from a magnetic brush in the two-component development method and an image forming apparatus including the same.

TABLE 2

| | Vertical Magnetic Force Gradient [mT/°] | | | | | Position [°] | | | | |
|---|---|---|---|---|---|---|---|---|---|---|
| | A | B | C | D | E | Q | R | P | S | Evaluation |
| Disclosed Example 1 | 1.1 | 2.0 | 1.5 | 1.6 | 4.8 | 297 | 305 | 315 | 318 | G |
| Disclosed Example 2 | 1.2 | 2.1 | 1.6 | 1.8 | 4.5 | 302 | 311 | 320 | 325 | G |
| Disclosed Example 3 | 1.1 | 1.5 | 1.4 | 1.7 | 3.4 | 308 | 318 | 311 | 331 | F |
| Comparative Example 1 | 1.7 | N/A | N/A | 2.9 | 5.6 | — | — | N/A | — | P |
| Comparative Example 2 | 1.8 | N/A | N/A | 3.6 | 3.8 | — | — | N/A | — | P |
| Comparative Example 3 | 2.0 | N/A | N/A | 2.7 | 3.4 | — | — | N/A | — | P |
| Comparative Example 4 | 0.6 | N/A | N/A | 2.1 | 3.3 | — | — | N/A | — | P |

Table 2 confirms the following. The developing devices 3*a* to 3*d* according to Disclosed Examples 1 to 3, where point P at which the vertical magnetic force gradient had the local minimum value C was on the downstream side of point

What is claimed is:

1. A developing device, comprising:

a developing container that stores a two-component developer containing a magnetic carrier and a toner;

a developer carrying member that is rotatably supported on the developing container and carries the developer on an outer circumferential surface thereof; and a regulation member that is arranged to be opposed at a prescribed distance to the developer carrying member, the developing device developing an electrostatic latent image formed on a surface of an image carrying member into a toner image, wherein the developer carrying member includes:

a developing sleeve that is rotatable, carries the developer, and has a surface on which a magnetic brush is formed; and a magnet that is unrotatably secured in the developing sleeve and has a plurality of magnetic poles arranged at a prescribed distance from each other in a circumferential direction, which include a regulation pole that is arranged at a position opposed to the regulation member and a downstream-side magnetic pole that is arranged on a downstream side of the regulation pole with respect to a rotation direction of the developing sleeve, the magnet is such that a vertical magnetic force gradient [mT/°] has a local minimum value C within a range of 10°, upstream in the rotation direction of the developing sleeve, of a position at which a vertical magnetic force is 0 [mT] between a downstream-side surface of the regulation member and the downstream-side magnetic pole with respect to the rotation direction of the developing sleeve.

2. The developing device according to claim 1, wherein a point P at which the vertical magnetic force gradient [mT/°] has a local minimum value in a circumferential direction of the magnet is arranged on a downstream-side of a point R at which the vertical magnetic force and a horizontal magnetic force are equal but on an upstream side of a point S at which the vertical magnetic force is 0 [mT].

3. The developing device according to claim 2, wherein the point P is arranged on a downstream side of a point Q at which a magnetic force ratio of the vertical magnetic force to the horizontal magnetic force is 1:2.

4. The developing device according to claim 2, wherein a relationship among an absolute value of the local minimum value C of the vertical magnetic force gradient at the point P, an absolute value of a local maximum value B of the vertical magnetic force gradient present between the downstream-side surface of the regulation member and the point P with respect to the rotation direction of the developing sleeve, an absolute value of a local maximum value E of the vertical magnetic force gradient present between the point P and a peak of the vertical magnetic force of the downstream-side magnetic pole, and an absolute value of the vertical magnetic force gradient D at a position at which the vertical magnetic force is 0 [mT]

fulfills the expression (1) below:

$$|C| \leq |D| < |B| < |E| \tag{1}$$

5. The developing device according to claim 1, wherein the downstream-side magnetic pole is a main pole arranged in a developing region in which the developer carrying member and the image carrying member is opposed to each other.

6. The developing device according to claim 1, wherein the carrier has a coat layer of a resin formed on a surface of a carrier core that is a particle of a magnetic substance, the coat layer containing carbon black as an electric conductor and a barium titanate as a ferroelectric substance, the barium titanate has a volume average particle diameter of not less than 100 nm and not more than 500 nm, and the barium titanate is added in an amount of 5 to 45 parts by mass with respect to 100 parts by mass of a coat resin forming the coat layer.

7. The developing device according to claim 6, wherein the barium titanate is added in an amount of 25 to 45 parts by mass with respect to 100 pars by mass of the coat resin.

8. An image forming apparatus, comprising:

an image carrying member that has a photosensitive layer formed on a surface thereof; and the developing device according to claim 1 that makes the toner adhere to the electrostatic latent image formed on the image carrying member so as to form a toner image.

* * * * *